US011401365B2

(12) United States Patent
Gorman et al.

(10) Patent No.: US 11,401,365 B2
(45) Date of Patent: Aug. 2, 2022

(54) THERMOPLASTIC POLYOXAZOLIDONES FROM DIISOCYANATES AND DIGLYCIDYL ETHER OF 2-PHENYL- 1,3-PROPANEDIOL DERIVAITIVES

(71) Applicant: BASF SE, Ludwigshafen am Rhein (DE)

(72) Inventors: Irene Gorman, Ludwigshafen (DE); Veit Stegmann, Ludwigshafen (DE); Hans-Josef Thomas, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/645,195

(22) PCT Filed: Sep. 20, 2018

(86) PCT No.: PCT/EP2018/075402
§ 371 (c)(1),
(2) Date: Mar. 6, 2020

(87) PCT Pub. No.: WO2019/063391
PCT Pub. Date: Apr. 4, 2019

(65) Prior Publication Data
US 2020/0291165 A1  Sep. 17, 2020

(30) Foreign Application Priority Data
Sep. 29, 2017  (EP) .................................... 17194083

(51) Int. Cl.
C08G 18/00 (2006.01)
C08G 59/24 (2006.01)

(52) U.S. Cl.
CPC ......... C08G 18/003 (2013.01); C08G 59/245 (2013.01)

(58) Field of Classification Search
CPC ............................ C08G 18/003; C08G 59/245
USPC ........................................................ 525/528
See application file for complete search history.

(56) References Cited

U.S. PATENT DOCUMENTS

| 3,687,897 | A |   | 8/1972  | Clarke |
|-----------|---|---|---------|--------|
| 3,694,406 | A | * | 9/1972  | D'Aleilio ............... C08G 59/26 528/51 |
| 3,737,406 | A | * | 6/1973  | D'Alelio ............ C08G 59/304 528/51 |
| 2011/0268685 | A1 |   | 11/2011 | Derks |
| 2012/0245252 | A1 |   | 9/2012  | Gan et al. |
| 2014/0128503 | A1 | * | 5/2014  | Karl ..................... C07D 303/28 523/400 |
| 2015/0073115 | A1 |   | 3/2015  | Gan et al. |
| 2017/0081462 | A1 |   | 3/2017  | Muller et al. |
| 2017/0088659 | A1 |   | 3/2017  | Muller et al. |
| 2018/0051119 | A1 |   | 2/2018  | Holtgrewe et al. |

FOREIGN PATENT DOCUMENTS

| WO | WO 86/06734 A1    | 11/1986 |
| WO | WO 2014/072216 A1 | 5/2014  |
| WO | WO 2015/173110 A1 | 11/2015 |
| WO | WO 2015/173111 A1 | 11/2015 |
| WO | 10 2014 226 838 A1 | 6/2016 |

OTHER PUBLICATIONS

Inernational Search Report translation dated Nov. 20, 2019, in PCT/EP2018/075402, 2 pages.

* cited by examiner

Primary Examiner — David T Karst
(74) Attorney, Agent, or Firm — Grüneberg and Myers PLLC

(57) ABSTRACT

A method for preparing a thermoplastic polyoxazolidone, the method including catalytically reacting one or more aromatic diisocyanates and one or more diepoxides, wherein the one or more diepoxides comprise one or more 2-phenylpropane-1,3-diol diglycidyl ether derivatives. The one or more diepoxides further contain one or more diglycidyl ethers of aromatic diols.

11 Claims, No Drawings

THERMOPLASTIC POLYOXAZOLIDONES FROM DIISOCYANATES AND DIGLYCIDYL ETHER OF 2-PHENYL- 1,3-PROPANEDIOL DERIVAITIVES

The present invention relates to methods for the catalytic preparation of polyoxazolidones from aromatic diisocyanates and 2-phenylpropane-1,3-diol diglycidyl ether derivatives, and to the corresponding polyoxazolidones and the use thereof as thermoplastics.

The catalytic preparation of polyoxazolidones based on diisocyanate and diepoxy compounds (diisocyanates and diepoxides) is known in principle (WO 86/06734, U.S. Pat. No. 3,687,897, WO 2015/173111, DE 10 2014 226 838, WO 2015/173110). By choosing suitable catalysts, linear polyoxazolidones that may be used as thermoplastics can be prepared with high selectivity. An unwanted side reaction is isocyanate trimerization to form isocyanurate structures. This side reaction leads to branched polymers and thus to a loss of thermoplastic properties.

Polyoxazolidones are typically prepared using diepoxides having an aromatic basic structure, such as bisphenol A diglycidyl ether. A drawback of the polyoxazolidones thus obtained is that they are brittle and have comparatively high melt viscosity, which causes problems when processing thermoplastic polyoxazolidones. The use of diepoxides having an aliphatic basic structure, as is mentioned for example in U.S. Pat. No. 3,687,897 or US2015/073115 (see therein for the preparation of adducts containing an oxazolidone ring), leads to polyoxazolidones having only a low glass transition temperature.

The object of the present invention was to provide linear thermoplastic polyoxazolidones having low melt viscosity allied with a comparatively high glass transition temperature, and a method for the preparation thereof. Such thermoplastic polyoxazolidones preferably also have good electrical insulation properties and comparatively low brittleness.

The present invention accordingly relates to a method for preparing a thermoplastic polyoxazolidone by catalytic reaction (polyaddition) of one or more aromatic diisocyanates and one or more diepoxides, wherein the one or more diepoxides consist wholly or partly of 2-phenylpropane-1, 3-diol diglycidyl ether derivatives (PPD-DGE derivatives).

In addition, the present invention relates to a thermoplastic polyoxazolidone obtainable according to the method of the invention. The thermoplastic polyoxazolidones of the invention preferably have a number-average molecular weight ($M_n$) of not less than 2000 g/mol, more preferably of not less than 2500 g/mol, the number average molecular weight ($M_n$) being determined by gel-permeation chromatography.

In a particular embodiment of the method of the invention and of the thermoplastic polyoxazolidone of the invention, the one or more diepoxides comprises not less than 70% by weight, preferably not less than 80% by weight, more preferably not less than 90% by weight, and most preferably 100% by weight, of 2-phenylpropane-1,3-diol diglycidyl ether derivatives. This means that the amount of other diepoxides, for example bisphenol A diglycidyl ether, that is used in this particular embodiment is not more than 30% by weight, preferably not more than 20% by weight, more preferably not more than 10% by weight, and most preferably none at all.

In a preferred embodiment of the method of the invention or of the thermoplastic polyoxazolidone of the invention, one or more diglycidyl ethers of aromatic diols are used as diepoxides in addition to the one or more 2-phenylpropane-1,3-diol diglycidyl ether derivatives. Aromatic diols in the context of this invention are diols in which both OH functions are bonded to carbon atoms that are part of the same or different aromatic systems. These diglycidyl ethers of aromatic diols are preferably selected from the group consisting of bisphenol A diglycidyl ether and bisphenol F diglycidyl ether. In this particular embodiment, the weight ratio of 2-phenylpropane-1,3-diol diglycidyl ether derivatives to diglycidyl ethers of aromatic diols is preferably in the range from 5:95 to 95:5, more preferably in the range from 5:95 to 75:25, even more preferably in the range from 10:90 to 70:30, and in particular in the range from 20:80 to 60:40.

The 2-phenylpropane-1,3-diol diglycidyl ether derivatives are preferably 2-phenylpropane-1,3-diol diglycidyl ether derivatives of the formula I

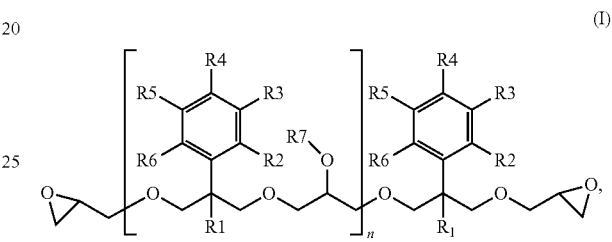

(I)

where

R1 is an alkyl group or an aryl group, preferably an alkyl group having 1 to 5 carbon atoms or an aryl group having 6 to 10 carbon atoms, more preferably a methyl group, R2 to R6 are independently a hydrogen atom, an alkyl group having 1 to 4 carbon atoms, a halogen atom (F, Cl, Br, I) or a nitro group, preferably a hydrogen atom or an alkyl group having 1 to 4 carbon atoms, R7 is a hydrogen atom or a glycidyl group, and n=0 to 100, preferably 0 to 30, and where alternatively R2 and R3 or R3 and R4 may also each collectively, together with the benzene ring to which they are attached, form a fused aromatic or heteroaromatic system, the net result being, together with this benzene ring, for example, a naphthyl or indolyl substituent.

Particular preference is given to PPD-DGE derivatives of the formula I in which

R1 is an alkyl group or an aryl group, preferably an alkyl group having 1 to 5 carbon atoms or an aryl group having 6 to 10 carbon atoms, more preferably a methyl group, R2 to R6 are independently a hydrogen atom, an alkyl group having 1 to 4 carbon atoms, a halogen atom (F, Cl, Br, I) or a nitro group, preferably a hydrogen atom or an alkyl group having 1 to 4 carbon atoms, R7 is a hydrogen atom or a glycidyl group, and n=0 to 100, preferably 0 to 30.

In the case of PPD-DGE derivatives of the formula I that have two or more R7 radicals (n=2 to 100), R7 is in each case independently a hydrogen atom or a glycidyl group.

Alkyl groups in the context of the invention have 1 to 20 carbon atoms. They may be linear, branched or cyclic. They preferably have no substituents containing heteroatoms. Heteroatoms are all atoms other than carbon and hydrogen atoms.

Aryl groups in the context of the invention have 6 to 20 carbon atoms. They preferably have no substituents containing heteroatoms. Heteroatoms are all atoms other than carbon and hydrogen atoms.

In a particular embodiment of the invention, the 2-phenylpropane-1,3-diol diglycidyl ether derivative is an oligomeric PPD-DGE derivative of the formula I in which n=1 to 100, preferably 1 to 30. An oligomeric PPD-DGE derivative of the formula I in the context of the invention is also to be understood as meaning a mixture of oligomeric PPD-DGE derivatives having different n and different substitution patterns for R7 (hydrogen atom or glycidyl group).

In a further particular embodiment of the invention, the 2-phenylpropane-1,3-diol diglycidyl ether derivative is a monomeric PPD-DGE derivative of the formula I where n=0.

In a further embodiment of the invention, the 2-phenylpropane-1,3-diol diglycidyl ether derivative is a mixture of monomeric and oligomeric PPD-DGE derivatives of the formula I.

In a particular embodiment of the invention, the 2-phenylpropane-1,3-diol diglycidyl ether derivative is a 2-phenylpropane-1,3-diol diglycidyl ether derivative of the formula I in which R1 is an alkyl group having 1 to 4 carbon atoms, preferably a methyl group, and R2 to R7 and n are as defined above. Particular preference is given to 2-phenylpropane-1,3-diol diglycidyl ether derivatives of the formula I in which R1 is an alkyl group having 1 to 4 carbon atoms, preferably a methyl group, and R2 to R6 are each a hydrogen atom, n=0 to 100, preferably 0 to 30, and R7 is as defined above (monomeric or oligomeric 2-alkyl-2-phenylpropane-1,3-diol diglycidyl ethers or monomeric or oligomeric 2-methyl-2-phenylpropane-1,3-diol diglycidyl ethers).

In a particularly preferred embodiment of the invention, the 2-phenylpropane-1,3-diol diglycidyl ether derivative is monomeric 2-methyl-2-phenylpropane-1,3-diol diglycidyl ether (MPPD-DGE) corresponding to formula I in which R1 is a methyl group and R2 to R6 are each a hydrogen atom and n=0, and oligomeric MPPD-DGE corresponding to formula I in which R1 is a methyl group and R2 to R6 are each a hydrogen atom, n=1 to 100, preferably 1 to 30, and R7 is (independently) a hydrogen atom or a glycidyl group, and also mixtures of monomeric and oligomeric MPPD-DGE.

The preparation of PPD-DGE derivative of the invention is described in WO 2014/072216.

The epoxy equivalent weight (EEVV) of the PPD-DGE derivative of the invention is preferably between 139 and 500, in particular between 140 and 200. The epoxy equivalent weight of an epoxy compound is defined here as the amount of the substance (in grams) that contains 1 mol of oxirane rings.

Aromatic diisocyanates in the context of the invention are diisocyanates having an aromatic basic structure. The isocyanate groups are preferably, but not necessarily, bonded directly to a carbon atom of the aromatic system. Aromatic diisocyanate is understood in the present context as meaning both a single substance and a mixture of substances.

The aromatic diisocyanate of the invention is preferably one or more compounds selected from the group consisting of diphenylmethane 2,2'-diisocyanate (2,2'-MDI), diphenylmethane 2,4'-diisocyanate (2,4'-MDI), diphenylmethane 4,4'-diisocyanate (4,4'-MDI), naphthylene 1,5-diisocyanate (1,5-NDI), tolylene 2,4-diisocyanate (2,4-TDI), tolylene 2,6-diisocyanate (2,6-TDI), diphenylmethane diisocyanate, 3,3'-dimethyldiphenyl diisocyanate, diphenylethane 1,2-diisocyanate, paraphenylene 2,4-diisocyanate (PPDI), and tetramethylenexylene 2,4-diisocyanate (TMXDI). The aromatic diisocyanates are more preferably selected from the group consisting of tolylene diisocyanate (2,4-TDI), tolylene 2,6-diisocyanate (2,6-TDI), diphenylmethane diisocyanate (2,2'-MDI), diphenylmethane 2,4'-diisocyanate (2,4'-MDI), and diphenylmethane 4,4'-diisocyanate (4,4'-MDI).

In a particular embodiment of the method of the invention, in addition to the aromatic diisocyanates, aromatic monoisocyanates may also be added to the reaction mixture for the catalytic preparation of polyoxazolidones. These monoisocyanates are preferably naphthyl 1-isocyanate or naphthyl 2-isocyanate. The monoisocyanates are preferably used in a proportion, based on the total amount of aromatic diisocyanates, of up to not more than 8 mol %, preferably of 0.1 to 6 mol %, more preferably of 0.2 to 5 mol %. The monoisocyanates are preferably used in a proportion, based on the total amount of diepoxides, of 0 to 10 mol %, preferably of 1 to 8 mol %, more preferably of 2 to 6 mol %. Monoisocyanates are used as end-blocking groups to improve melt stability and as chain-length regulators.

A large number of suitable catalysts for the selective preparation of linear polyoxazolidones are known in the literature. Customary catalysts for the method of the invention for preparing linear polyoxazolidones are alkali metal halides, for example lithium bromide, tertiary amines, quaternary ammonium salts, for example tetraalkylammonium halides, urea compounds, for example, N,N"-(4-methyl-m-phenylene)bis[N',N'-dimethylurea] (Dyhard UR500), piperidinium compounds, for example 1-butyl-1-methylpiperidinium chloride (BMPM-Cl), imidazolium compounds, for example 1-ethyl-3-methylimidazolium bromide (EMIM-Br), 1-ethyl-3-methylimidazolium chloride (EMIM-Cl), 1-ethyl-3-methylimidazolium dicyandiamide (EMIM-DICY), 1-ethyl-3-methylimidazolium iodide (EMIM-I), 1-ethyl-2,3-dimethylimidazolium bromide (EDMIM-Br), 1-ethyl-3-methylimidazolium diethylphosphate (EMIM-DEP) or 1-benzyl-3-methylimidazolium chloride (BEMIM-Cl), phosphonium compounds, for example tetraalkylphosphonium halides or tetraalkylphosphonium hydroxides, Lewis acids, for example aluminum chloride, or complexes of Lewis acids with Lewis bases. The catalysts are used individually or in combination. In particular embodiments of the method, primary or secondary aliphatic alcohols are used as additional co-catalysts.

The catalytic reaction (polyaddition) in the method of the invention for preparing a thermoplastic polyoxazolidone is preferably carried out at a temperature in the range from 140° C. to 240° C. In the case of polyadditions in solvents, the preferred temperature range is in particular 140° C. to 220° C., more preferably 150° C. to 200° C., and particularly preferably 160° C. to 180° C.; if the polyaddition is being carried out in neat form in the melt, the preferred temperature range is in particular 150° C. to 240° C., more preferably 150° C. to 230° C., and particularly preferably 155° C. to 225° C.

In particular embodiments of the method of the invention for preparing linear polyoxazolidones, additional further additives such as fillers, fibers, antioxidants, separating agents, pigments, surfactants, blowing agents or antifoams are used in the reaction mixture in the customary manner and in customary amounts.

The method of the invention for preparing linear polyoxazolidones may be carried out in neat form in the reactant melt or in a solvent.

In a particular embodiment of the method of the invention for preparing linear polyoxazolidones, in a first step, the diepoxide and the catalyst are mixed or dissolved in a solvent and heated to reaction temperature. The mixture/solution is preferably inertized with nitrogen; oxygen must be excluded in the reaction. The diisocyanate is then metered in slowly, preferably with maintenance of the reaction temperature. The reaction temperature is preferably within a range from 140° C. to 240° C. In the case of polyadditions in solvents, the preferred temperature range is in particular 140° C. to 220° C., more preferably 150° C. to 200° C., and particularly preferably 160° C. to 180° C.; if the polyaddition is being carried in neat form in the melt, the preferred temperature range is in particular 150° C. to 240° C., more preferably 150° C. to 230° C., and particularly preferably 155° C. to 225° C.

The content of free diisocyanate in the reaction mixture should be kept as low as possible in order to prevent trimerization of the diisocyanate. This is controlled either by the rate at which the diisocyanate is metered in and/or by the reactivity, that is to say the amount of catalyst that is added.

In a further particular embodiment of the method of the invention for preparing linear polyoxazolidones, in a first step, the catalyst is dissolved in a solvent and heated to reaction temperature. Then, in a second step, a mixture of the diisocyanate and the diepoxide, preferably dissolved in a solvent, is slowly metered in, preferably with maintenance of the reaction temperature. The addition rate depends on the rate of reaction of the diisocyanate and diepoxide used, the aim being to keep their content in the reaction mixture as low as possible in order to prevent trimerization of the diisocyanate. The reaction temperature is preferably within a range from 140° C. to 220° C., more preferably 150 to 200° C., and particularly preferably 160 to 180° C.

On completion of the reaction (as can be seen, for example, by IR spectroscopy through the decrease in the NCO peak), the polymer in the reaction mixture is preferably precipitated by dropwise addition to a mixture of water and ethanol (for example 20:80 parts by weight). The solids can then be filtered off, washed with warm water (for example 50° C.) and then with ethanol, and finally dried to constant mass, for example under reduced pressure.

In a preferred embodiment, the water content of the reaction mixture in the preparative method of the invention is less than 0.1% by weight. This prevents the side reaction of the diisocyanate to give urea or urea derivatives.

The molar ratio of epoxide groups to isocyanate groups in the diepoxides and isocyanates used in the method of the invention (diisocyanates and any monoisocyanates used) is preferably in a range between 2.0:1.0 and 1.0:1.05, preferably between 1.2:1.0 and 1.0:1.05, and particularly preferably between 1.1:1.0 and 1.0:1.01.

The catalyst concentration is customarily 0.05 mol % to 5.0 mol % based on epoxy groups, preferably 0.05 mol % to 1 mol %, and more preferably 0.05 mol % to 0.5 mol %.

The solvents are preferably dried before use. In a preferred embodiment, drying is effected by a molecular sieve.

Examples of solvents that may be used for the preparative method of the invention are N-methyl-2-pyrrolidone (NMP), 1,2-dichlorobenzene, N,N-dimethyllactamide or tetrahydrothiophene-1,1-dioxide. A particularly suitable solvent is tetrahydrothiophene-1,1-dioxide (sulfolane).

The present invention also relates to the use of the thermoplastic polyoxazolidone of the invention in the production of applications selected from coating, film, foam (by additional foaming of the preparation), electrical insulation (for example cable sheathing), laminate, fiber, shaped body, and modifier for thermoplastic materials (i.e. substances that influence the properties of another material). Each of these uses is on its own a preferred embodiment that is also referred to as an application. For this purpose, the thermoplastic polyoxazolidone is preferably provided in a first step as granules or powder. The applications are preferably produced therefrom by injection molding, calendering, powder sintering, laser sintering (3D printing) or extrusion.

The melt viscosity is an important processing property of thermoplastics. The melt viscosity in the sense of this invention is understood as meaning the viscosity of the melt, which is measured at a defined temperature above the melting temperature. For the production of, for example, shaped bodies or coatings, the material must flow freely in the melt; for plastics with high glass transition temperatures, this generally means that very high temperatures are necessary in order to achieve a favorable melt viscosity. This can result in the initiation of possible side reactions such as postcrosslinking, which leads to an increase in the melt viscosity, or cleavage of the polymer chains, which leads to a reduction in the melt viscosity. A lower melt viscosity at a given processing temperature or the achievement of a melt viscosity suitable for processing at a comparatively low temperature is therefore favorable for the processing and stability of the polymers in the processing operation. The melt viscosity is determined by established rheological methods, for example by frequency-dependent shear deformation in an oscillating plate-plate rheometer.

The glass transition temperature (Tg) can be determined using a differential calorimeter (DSC), for example in accordance with standard ASTM D 3418. This is done by heating a very small amount of sample (about 10 mg) in an aluminum crucible and measuring the heat flow to a reference crucible. The Tg step of the heat-flow curve can be evaluated via the inflection point, according to the half width or according to the midpoint temperature method.

The following examples show by way of example the advantageous properties of the catalysts and of the use thereof in a polymer according to the invention. The examples do not in any way restrict the concept of the invention.

EXAMPLES

Substances Used:
Starting Materials:
BADGE (bisphenol-A diglycidyl ether), Sigma-Aldrich, EEW: 174.7
MPPD-DGE (2-phenyl-2-methylpropane-1,3-diol diglycidyl ether), prepared according to WO2014/072216, example 1
NPG-DGE (neopentyl glycol diglycidyl ether), Sigma-Aldrich
2,4-TDI (tolyl 2,4-diisocyanate), Sigma-Aldrich, IEW (isocyanate equivalent weight in grams): 87.1
4,4'-MDI (4,4'-methylenebis(phenyl isocyanate)), Sigma-Aldrich, IEW: 125.1
Naphthyl 1-isocyanate, Sigma-Aldrich, IEW: 169.2
Catalysts:
BMPM-Cl (1-butyl-1-methylpiperidinium chloride), from Iolitec
EMIM-Br (1-ethyl-3-methylimidazolium bromide), from Iolitec
UR500 (N,N''-(4-methyl-m-phenylene)bis[N',N'-dimethylurea]), Alzchem (Dyhard® UR500)
Solvents:
Sulfolane, Merck, dried over 4 Å molecular sieve (Roth, bead form)
MTBE (methyl tert-butyl ether), Sigma-Aldrich
DMAC (N,N-dimethylacetamide), Merck
Determination of Polymer Characteristics:
The chemoselectivity of the reaction in respect of oxazolidone formation was determined by infrared spectroscopy (Nicolet 380 FT-IR spectrometer with ATR crystal and Omnic software from Thermo Fischer), with determination of the specific IR bands for oxazolidone (ox, 1750 cm$^{-1}$) and isocyanurate (trimer, 1705 cm$^{-1}$) according to the formula $R_{ox/trimer}$=IR band$_{ox}$/(IR band$_{ox}$+IR band$_{trimer}$).

The glass transition temperature (Tg) was measured using a differential calorimeter (DSC; DSC unit (Q2000) from Texas Instruments using Universal v 4.7A software from Texas Instruments) in accordance with standard ASTM D 3418 on samples each of approx. 7-10 mg. The following temperature profile was used: run 1: 20-180° C. at 5 K/min and run 2: 0-300° C. at 20 K/min. Tg was in each case determined in run 2.

The average polymer weight (weight average Mw or number average Mn) was determined by gel-permeation chromatography (GPC; 4×60 cm Phenomenex columns, pore size: 1000-10 000-10 000-1000 Å, packing: polymethyl methacrylate (PMMA), flow rate: 0.7 ml/min, detector: refractive index) at room temperature (22° C.). For this purpose, 100 μl samples of polymer solution in each case were injected. DMAC was used as solvent and mobile phase. The polymer signals were evaluated in the 60 to 120 min retention-time range. PMMA was used for calibration.

The melt viscosity (nm) of the polymers melts was determined using a rheometer (model DHR-2, TA Instruments) with a plate-plate measurement system (plate diameter 25 mm) by means of oscillatory measurements at a measurement temperature of 150° C. or 180° C. For this purpose, the sample was applied to the lower heated plate and equilibrated for 90 s on reaching the measurement temperature. The melt viscosity was determined on reaching a frequency of 1 rad/s (example 1 and comparative examples 1 and 2) or 0.5 rad/s (example 2 and comparative examples 3 and 4) during a frequency sweep that was run with a deformation of 1% at frequencies between 100 and 0.1 rad/s (downwards).

Example 1

Polyoxazolidones From 2,4-TDI and MPPD-DGE/BADGE Mixture (50:50); Polyaddition in Solvent 7.54 g of MPPD-DGE (EEW: 157.7), 7.54 g of BADGE, 43.5 mg of EMIM-Br, and 12.0 mg of UR500 were weighed into a 100 ml three-necked round-bottomed flask inertized with dry nitrogen and equipped with a magnetic stirrer, condenser, temperature sensor, and septum, and dissolved in 53.66 g of sulfolane. The solution was heated to 160° C. while purging with N$_2$. Over a period of 60 min, 7.86 g of 2,4-TDI was metered in continuously by means of a syringe pump/cannula, with stirring. At the end of the addition, samples were collected with a syringe at regular intervals and investigated by IR. On completion of the reaction of the isocyanate (after 30 min), identifiable by the decrease in the IR band at 2256 cm$^{-1}$, stirring was continued for a further hour at reaction temperature, after which the solution was cooled to approx. 50° C. and added slowly, with vigorous stirring, to 400 ml of ethanol/water mixture (80/20 V/V). This resulted in precipitation of the polymer that had formed, which was separated off by vacuum filtration. The polymer was washed with two 100 ml volumes of ethanol and then dried to constant mass under reduced pressure at approx. 50° C. The characteristics of the resulting fine white powder, which gave a clear solution in DMAC, are listed in table 1.

Comparative Example 1

Polyoxazolidones From 2,4-TDI and BADGE; Polyaddition in Solvent 17.08 g of BADGE, 46.7 mg of EMIM-Br, and 12.8 mg of UR500 were weighed into a 100 ml three-necked round-bottomed flask inertized with dry nitrogen and equipped with a magnetic stirrer, condenser, temperature sensor, and septum, and dissolved in 59.7 g of sulfolane. The solution was heated to 160° C. while purging with N$_2$. Over a period of 60 min, 8.45 g of 2,4-TDI was metered in continuously by means of a syringe pump/cannula, with stirring. At the end of the addition, samples were collected with a syringe at regular intervals and investigated by IR. On completion of the reaction of the isocyanate (after 30 min), identifiable by the decrease in the IR band at 2256 cm$^{-1}$, stirring was continued for a further hour at reaction temperature, after which the solution was cooled to approx. 50° C. and added slowly, with vigorous stirring, to 400 ml of ethanol/water mixture (80/20 VN). This resulted in precipitation of the polymer that had formed, which was separated off by vacuum filtration. The polymer was washed with two 100 ml volumes of ethanol and then dried to constant mass under reduced pressure at approx. 50° C. The characteristics of the resulting fine white powder are listed in table 1.

Comparative Example 2

Polyoxazolidones From 2,4-TDI and NPG-DGE/BADGE Mixture (50:50); Polyaddition in Solvent 7.83 g of NPG-DGE (EEW: 143.8), 7.83 g of BADGE, 47.4 mg of EMIM-Br, and 13.1 mg of UR500 were weighed into a 100 ml three-necked round-bottomed flask inertized with dry nitrogen and equipped with a magnetic stirrer, condenser, temperature sensor, and septum, and dissolved in 56.65 g of sulfolane. The solution was heated to 160° C. while purging with N$_2$. Over a period of 60 min, 8.56 g of 2,4-TDI was metered in continuously by means of a syringe pump/cannula, with stirring. At the end of the addition, a sample was collected with a syringe and investigated by IR. The reaction of the isocyanate was already complete immediately after the end of the addition, as identifiable by the decrease in the band at 2256 cm$^{-1}$. Stirring was continued for a further hour at reaction temperature, after which the solution was cooled to approx. 50° C. and added slowly, with vigorous stirring, to 400 ml of ethanol/water mixture (80/20 V/V). This resulted in precipitation of the polymer that had formed, which was separated off by vacuum filtration. The polymer was washed with two 100 ml volumes of ethanol and then dried to constant mass under reduced pressure at approx. 50° C. The characteristics of the resulting fine white powder, which gave a clear solution in DMAC, are listed in table 1.

TABLE 1

Characteristics of the 2,4-TDI-based polyoxazolidones

|  | Example 1 | Comp. example 1 | Comp. example 2 |
|---|---|---|---|
| Mw (in g/mol) | 12 583 | 35 740 | 12 799 |
| Mn (in g/mol) | 2746 | 8618 | 4612 |
| Tg (in ° C.) | 106 | 142 | 77.6 |
| $R_{ox/trimer}$ | 0.67 | 0.72 | 0.65 |
| $\eta_m$ at 150° C. (in Pas) | 285 | — | 241 |
| $\eta_m$ at 180° C. (in Pas) | — | 59139 | — |

Example 2

Polyoxazolidones From 4,4'-MDI and MPPD-DGE/BADGE Mixture (25:75); Solvent-Free Polyaddition An extruder (15 mL twin-screw micro compounder, MC 15 high torque and high force; from Xplore) equipped with two extruder screws and heated to an external temperature of 100° C. was filled with a mixture of 3.04 g of MPPD-DGE (purified by distillation, EEW: 149), 9.13 g of BADGE and 17.4 mg of BMPM-Cl that had been mixed beforehand for 3 h at 80° C. under a nitrogen atmosphere using a magnetic stirrer. Then, with argon inertization and with stirring (100 rpm), the external temperature of the extruder was increased to 160° C. and left for 5 min so that an internal temperature of approx. 155° C. was reached. The isocyanate mixture of 8.92 g of 4,4'-MDI and 0.25 g of naphthyl 1-isocyanate heated to 70° C. was then metered in continuously over a period of 60 min through the inlet of the front closure plate of the extruder by means of a syringe pump/cannula. After approx. 40 min from the start of the isocyanate addition, the viscosity of the mixture in the extruder begins to rise. Consequently, the external temperature of the extruder was increased 51 min after the start of the addition to 190° C., then 9 minutes later to 210° C., and finally one minute later to 220° C. 20 min after the end of the addition, the polyoxazolidone formed was removed as a polymer strand via the discharge valve of the extruder. The characteristics of the resulting polyoxazolidone are listed in table 2.

Comparative Example 3

Polyoxazolidones From 4,4'-MDI and BADGE; Solvent-Free Polyaddition

An extruder (15 mL twin-screw micro compounder, MC 15 high torque and high force; from Xplore) equipped with two extruder screws and heated to an external temperature of 100° C. was filled with a mixture of 12.21 g of BADGE and 16.8 mg of BMPM-Cl that had been mixed beforehand for 3 h at 80° C. under a nitrogen atmosphere using a magnetic stirrer. Then, with argon inertization and with stirring (100 rpm), the external temperature of the extruder was increased to 160° C. and left for 5 min so that an internal temperature of approx. 155° C. was reached. The isocyanate mixture of 8.57 g of 4,4'-MDI and 0.24 g of naphthyl 1-isocyanate heated to 70° C. was then metered in continuously over a period of 60 min through the inlet of the front closure plate of the extruder by means of a syringe pump/cannula. After approx. 40 min from the start of the isocyanate addition, the viscosity of the mixture in the extruder begins to rise. Consequently, the external temperature of the extruder was increased 51 min after the start of the addition to 190° C., then 9 minutes later to 210° C., and finally one minute later to 220° C. 20 min after the end of the addition, the polyoxazolidone formed was removed as a polymer strand via the discharge valve of the extruder. The characteristics of the resulting polyoxazolidone are listed in table 2.

Comparative Example 4

Polyoxazolidones From 4,4'-MDI and NPG-DGE/BADGE Mixture (25:75); Solvent-Free Polyaddition An extruder (15 mL twin-screw micro compounder, MC 15 high torque and high force; from Xplore) equipped with two extruder screws and heated to an external temperature of 100° C. was filled with a mixture of 2.92 g of NPG-DGE (purified by distillation, EEW: 112), 8.76 g of BADGE and 18.3 mg of BMPM-Cl that had been mixed beforehand for 3 h at 80° C. under a nitrogen atmosphere using a magnetic stirrer. Then, with argon inertization and with stirring (100 rpm), the external temperature of the extruder was increased to 160° C. and left for 5 min so that an internal temperature of approx. 155° C. was reached. The isocyanate mixture of 9.35 g of 4,4'-MDI and 0.26 g of naphthyl 1-isocyanate heated to 70° C. was then metered in continuously over a period of 60 min through the inlet of the front closure plate of the extruder by means of a syringe pump/cannula. After approx. 40 min from the start of the isocyanate addition, the viscosity of the mixture in the extruder begins to rise. Consequently, the external temperature of the extruder was increased 51 min after the start of the addition to 190° C., then 9 minutes later to 210° C., and finally one minute later to 220° C. 20 min after the end of the addition, the polyoxazolidone formed was removed as a polymer strand via the discharge valve of the extruder. The characteristics of the resulting polyoxazolidone are listed in table 2.

TABLE 2

Characteristics of the 4,4-MDI-based polyoxazolidones

|  | Example 2 | Comp. example 3 | Comp. example 4 |
|---|---|---|---|
| Mn (in g/mol) | 10 359 | 13 794 | 9807 |
| Mw (in g/mol) | 37 045 | 48 352 | 39 635 |
| Tg (in ° C.) | 135 | 162 | 129 |
| $R_{ox/trimer}$ | 0.83 | 0.88 | 0.83 |
| $\eta_m$ at 200° C. (in Pas) | 12 300 | 274 000 | 13 000 |
| $\eta_m$ at 240° C. (in Pas) | 588 | 7860 | 1070 |

The invention claimed is:

1. A method for preparing a thermoplastic polyoxazolidone, the method comprising:

catalytically reacting one or more aromatic diisocyanates with a mixture of one or more diepoxides comprising one or more 2-phenylpropane-1,3-diol diglycidyl ether derivatives and one or more diglycidyl ethers of aromatic diols.

2. The method according to claim 1, wherein the one or more diglycidyl ethers of aromatic diols are selected from the group consisting of bisphenol A diglycidyl ether and bisphenol F diglycidyl ether.

3. The method according to claim 1,
wherein a weight ratio of the one or more 2-phenylpropane-1,3-diol diglycidyl ether derivatives to the one or more diglycidyl ethers of aromatic diols is in a range from 5:95 to 95:5.

4. The method according to claim 1,
wherein the one or more 2-phenylpropane-1,3-diol diglycidyl ether derivatives are 2-phenylpropane-1,3-diol diglycidyl ether derivatives of formula I:

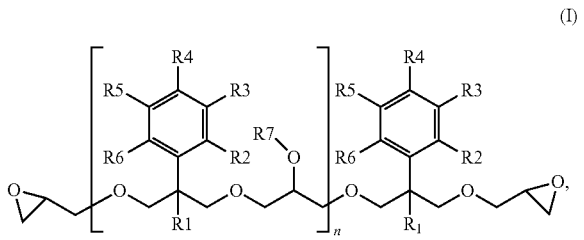

wherein
R1 is an alkyl group or an aryl group;
R2 to R6 are independently a hydrogen atom, an alkyl group having 1 to 4 carbon atoms, a halogen atom or a nitro group;
R7 is a hydrogen atom or a glycidyl group; and
n=0 to 100, and
alternatively
R2 and R3 or R3 and R4 are each optionally collectively, together with a benzene ring to which they are attached, form a fused aromatic or heteroaromatic system.

5. The method according to claim 4,
wherein
R1 is an alkyl group having 1 to 5 carbon atoms or an aryl group having 6 to 10 carbon atoms;
R2 to R6 are independently a hydrogen atom or an alkyl group having 1 to 4 carbon atoms;
R7 is a hydrogen atom or a glycidyl group; and
n=0 to 30.

6. The method according to claim 5,
wherein
R1 is an alkyl group having 1 to 4 carbon atoms; and
R2 to R6 are each a hydrogen atom.

7. The method according to claim 1,
wherein the one or more aromatic diisocyanates are selected from the group consisting of diphenylmethane 2,2'-diisocyanate, diphenylmethane 2,4'-diisocyanate, diphenylmethane 4,4'-diisocyanate, naphthylene 1,5-diisocyanate, tolylene 2,4-diisocyanate, tolylene 2,6-diisocyanate, diphenylmethane diisocyanate, 3,3'-dimethyldiphenyl diisocyanate, diphenylethane 1,2-diisocyanate, paraphenylene 2,4-diisocyanate, and tetramethylenexylene 2,4-diisocyanate.

8. The method according to claim 1,
wherein the catalytically reacting is carried out in the presence of a catalyst selected from the group consisting of an alkali metal halide, a tertiary amine, a quaternary ammonium salt, a urea compound, a piperidinium compound, an imidazolium compound, a phosphonium compound, a Lewis acid, and a complex of a Lewis acid with a Lewis base.

9. The method according to claim 1, wherein the catalytically reacting is carried out at a temperature in a range from 140 to 240° C.

10. The method according to claim 1, wherein the catalytically reacting is carried out in presence of sulfolane.

11. The method according to claim 1, wherein the catalytically reacting is carried out in neat form in a melt.

* * * * *